US012782212B2

(12) United States Patent
Tanaami et al.

(10) Patent No.: US 12,782,212 B2
(45) Date of Patent: Nov. 3, 2026

(54) TORQUE SENSOR, TORQUE DETECTOR, AND METHOD FOR MANUFACTURING TORQUE SENSOR

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 189 days.

(21) Appl. No.: 18/808,215

(22) Filed: Aug. 19, 2024

(65) Prior Publication Data

US 2025/0085178 A1 Mar. 13, 2025

(30) Foreign Application Priority Data

Sep. 13, 2023 (JP) ................................ 2023-148693
Oct. 30, 2023 (JP) ................................ 2023-185662

(51) Int. Cl.
*G01L 3/10* (2006.01)

(52) U.S. Cl.
CPC .................................... *G01L 3/108* (2013.01)

(58) Field of Classification Search
CPC ......... G01L 3/108; G01L 3/04; G01L 5/0061; B23P 19/00
See application file for complete search history.

(56) References Cited

U.S. PATENT DOCUMENTS

| | | | | |
|---|---|---|---|---|
| 3,717,029 | A * | 2/1973 | Tveter | G01L 3/108 74/136 |
| 2018/0017452 | A1* | 1/2018 | Okada | G01L 3/106 |
| 2019/0250051 | A1* | 8/2019 | Suzuki | G01L 3/10 |
| 2019/0310146 | A1* | 10/2019 | Suzuki | G01L 3/108 |
| 2020/0348194 | A1* | 11/2020 | Endo | G01L 3/108 |
| 2020/0348195 | A1* | 11/2020 | Endo | G01L 3/1457 |
| 2020/0400515 | A1* | 12/2020 | Endo | B25J 13/085 |
| 2021/0114230 | A1* | 4/2021 | Endo | G01L 3/1457 |
| 2021/0116315 | A1* | 4/2021 | Endo | G01L 5/0076 |
| 2021/0131891 | A1* | 5/2021 | Hoshino | B25J 13/085 |
| 2021/0131892 | A1* | 5/2021 | Endo | B25J 13/085 |
| 2021/0131893 | A1* | 5/2021 | Takada | B25J 19/02 |
| 2022/0178772 | A1* | 6/2022 | Takada | G01L 1/2206 |
| 2023/0010885 | A1* | 1/2023 | Miyashita | G01L 1/2206 |

FOREIGN PATENT DOCUMENTS

JP 2022-73177 A 5/2022

* cited by examiner

*Primary Examiner* — David J Bolduc
(74) *Attorney, Agent, or Firm* — Harness, Dickey & Pierce, P.L.C

(57) ABSTRACT

A torque detector of a torque sensor has a columnar shape, one end sandwiched between bottom surfaces of a first frame part and a second frame part, the other end sandwiched between bottom surfaces of a first core part and a second core part, and film-shaped strain gauges respectively provided to two side surfaces thereof, the two side surfaces being orthogonal to the bottom surface of the first frame part.

11 Claims, 3 Drawing Sheets

TORQUE SENSOR, TORQUE DETECTOR, AND METHOD FOR MANUFACTURING TORQUE SENSOR

This Nonprovisional application claims priority under 35 U.S.C. § 119 on Patent Application No. 2023-148693 filed in Japan on Sep. 13, 2023 and Patent Application No. 2023-185662 filed in Japan on Oct. 30, 2023, the entire contents of which are hereby incorporated by reference.

TECHNICAL FIELD

The present disclosure relates to a torque sensor, a torque detector, and a method for manufacturing the torque sensor.

BACKGROUND ART

In recent years, torque sensors for measuring an output torque from an actuator and the like have been developed. Patent Literature 1 discloses a torque sensor including an inside structure, an outside structure, and a bridge via which the two structures are connected to each other.

CITATION LIST

Patent Literature

[Patent Literature 1]
Japanese Patent Application Publication, Tokukai, No. 2022-73177

SUMMARY OF INVENTION

Technical Problem

The torque sensor includes a strain gauge disposed in a strain portion where strain occurs in response to an applied torque. The strain caused by the applied torque appears notably in a side surface of a beam of the torque sensor. However, it is difficult to accurately dispose the strain gauge at a predetermined position in the side surface of the beam.

An aspect of the present disclosure has an object to provide a torque sensor capable of measuring a torque with high accuracy.

Solution to Problem

In order to attain the above object, a torque sensor in accordance with an aspect of the present disclosure includes a first frame part, a second frame part, a first core part, a second core part, and a torque detector. The first frame part has a tubular shape. The second frame part is disposed at a location where a bottom surface of the second frame part faces a bottom surface of the first frame part, and the second frame part has a tubular shape concentric to the first frame part. The first core part is disposed in a hollow space of the first frame part, and the first core part has a tubular or columnar shape concentric to the first frame part. The second core part is disposed at a location which is in a hollow space of the second frame part and where a bottom surface of the second core part faces a bottom surface of the first core part, and the second core part has a tubular or columnar shape concentric to the first frame part. The torque detector has a columnar shape, the torque detector has one end sandwiched between the bottom surfaces of the first frame part and the second frame part, the torque detector has the other end sandwiched between the bottom surfaces of the first core part and the second core part, and the torque detector has film-shaped strain gauges respectively provided to two side surfaces of the torque detector, the two side surfaces being orthogonal to the bottom surface of the first frame part.

In order to attain the above object, a torque detector in accordance with an aspect of the present disclosure is used in a torque sensor including a first frame part, a second frame part, a first core part, and a second core part. The first frame part has a tubular shape. The second frame part is disposed at a location where a bottom surface of the second frame part faces a bottom surface of the first frame part, and the second frame part has a tubular shape concentric to the first frame part. The first core part is disposed in a hollow space of the first frame part, and the first core part has a tubular or columnar shape concentric to the first frame part. The second core part is disposed at a location which is in a hollow space of the second frame part and where a bottom surface of the second core part faces a bottom surface of the first core part, and the second core part has a tubular or columnar shape concentric to the first frame part. The torque detector has a columnar shape, the torque detector has one end sandwiched between the bottom surfaces of the first frame part and the second frame part, the torque detector has the other end sandwiched between the bottom surfaces of the first core part and the second core part, and the torque detector has film-shaped strain gauges respectively provided to two side surfaces of the torque detector, the two side surfaces being orthogonal to the bottom surface of the first frame part.

In order to attain the above object, a method for manufacturing a torque sensor in accordance with an aspect of the present disclosure is a method for manufacturing a torque sensor including a first frame part, a second frame part, a first core part, a second core part, and a torque detector. The first frame part has a tubular shape. The second frame part is disposed at a location where a bottom surface of the second frame part faces a bottom surface of the first frame part, and the second frame part has a tubular shape concentric to the first frame part. The first core part is disposed in a hollow space of the first frame part, and the first core part has a tubular or columnar shape concentric to the first frame part. The second core part is disposed at a location which is in a hollow space of the second frame part and where a bottom surface of the second core part faces a bottom surface of the first core part, and the second core part has a tubular or columnar shape concentric to the first part. The method for manufacturing the torque sensor includes a first step, a second step, and a third step. The first step forms a film-shaped strain gauge on a side surface of the torque detector formed in a columnar shape. The second step causes one end of the torque detector to be sandwiched between the bottom surfaces of the first frame part and the second frame part, and causes the other end of the torque detector to be sandwiched between the bottom surfaces of the first core part and the second core part. The third step fastens the first frame part and the second frame part to each other, and fastens the first core part and the second core part to each other. The side surface of the torque detector on which side surface the film-shaped strain gauge is formed in the first step is the side surface which is made orthogonal to the bottom surfaces of the first frame part and the second frame part in the second step.

Advantageous Effects of Invention

In accordance with an aspect of the present disclosure, it is possible to provide a torque sensor capable of measuring a torque with high accuracy.

DESCRIPTION OF EMBODIMENTS

First Embodiment (Torque Sensor)

Figure 1:
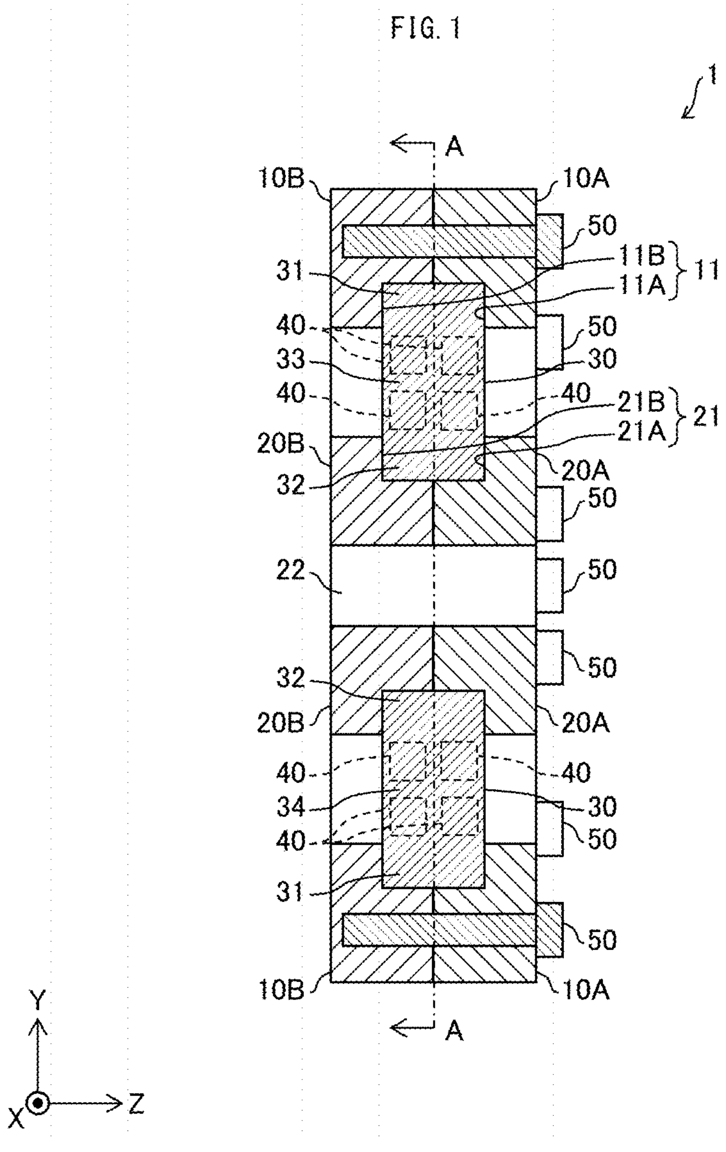
FIG. 1 is a cross-sectional view illustrating a configuration of a torque sensor in accordance with a first embodiment of the present disclosure.

FIG. 1 is a cross-sectional view illustrating a configuration of a torque sensor in accordance with a first embodiment of the present disclosure. A torque sensor 1 shown in FIG. 1 includes a first frame part 10A, a second frame part 10B, a first core part 20A, a second core part 20B, and a plurality of torque detectors 30. In the description below, an X-axis direction, a Y-axis direction, and a Z-axis direction n are defined as indicated by the arrows shown in FIG. 1.

The first frame part 10A and the second frame part 10B each have a tubular shape, and are concentric to each other. Here, the "tubular shape" refers to a columnar shape which has a bottom surface, an upper surface, and a through-hole which is between the bottom surface and the upper surface and provides a hollow space. The tubular shape is not limited to a cylindrical shape. In FIG. 1, bottom surfaces of the first frame part 10A and the second frame part 10B are in parallel with an XY plane. The first frame part 10A and the second frame part 10B are disposed at locations where the bottom surfaces of the first frame part 10A and the second frame part 10B face each other. The first frame part 10A has a recess 11A which is provided in the periphery of an inner edge of the bottom surface of the first frame part 10A and which is recessed in the Z-axis direction. Meanwhile, the second frame part 10B has a recess 11B which is provided in the periphery of an inner edge of the bottom surface of the second frame part 10B and which is recessed in the Z-axis direction. When the first frame part 10A and the second frame part 10B are disposed at the locations where the bottom surfaces of the first frame part 10A and the second frame part 10B face each other, bottom parts of the recesses 11A and 11B face each other and openings of the recesses 11A and 11B overlap in position each other, so that a first recess 11 is formed by the recesses 11A and 11B.

The first core part 20A and the second core part 20B each have a tubular shape. The first core part 20A and the second core part 20B are concentric to the first frame part 10A and the second frame part 10B. In FIG. 1, bottom surfaces of the first core part 20A and the second core part 20B are in parallel with the XY plane. The first core part 20A is disposed in a hollow space of the first frame part 10A. The second core part 20B is disposed in a hollow space of the second frame part 10B. The first core part 20A and the second core part 20B are disposed such that the bottom surfaces of the first core part 20A and the second core part 20B face each other. The first core part 20A has a recess 21A which is provided in the periphery of an outer edge of the bottom surface of the first core part 20A and which is recessed in the Z-axis direction. Meanwhile, the second core part 20B has a recess 21B which is provided in the periphery of an outer edge of the bottom surface of the second core part 20B and which is recessed in the Z-axis direction. When the first core part 20A and the second core part 20B are disposed at the locations where the bottom surfaces of the first core part 20A and the second core part 20B face each other, bottom parts of the recesses 21A and 21B face each other and openings of the recesses 21A and 21B overlap in position each other, so that a second recess 21 is formed by the recesses 21A and 21B.

Each of the torque detectors 30 has a columnar shape. The torque detector 30 has a first end 31, which is one end of the torque detector 30. The first end 31 of the torque detector 30 is sandwiched, in the first recess 11, between the bottom surfaces of the first frame part 10A and the second frame part 10B. Further, the torque detector 30 has a second end 32, which is the other end of the torque detector 30. The second end 32 of the torque detector 30 is sandwiched, in the second recess 21, between the bottom surfaces of the first core part 20A and the second core part 20B. The torque detector 30 has a length in the Z-axis direction which is equal to or more than each of depths in the Z-axis direction of the first recess 11 and the second recess 21. In FIG. 1, the length in the Z-axis direction of the torque detector 30 is equal to a sum of the depths in the Z-axis direction of the first recess 11 and the second recess 21. Each of the depths of the first recess 11 and the second recess 21 is a half of the length in the Z-axis direction of the torque detector 30.

Figure 2:
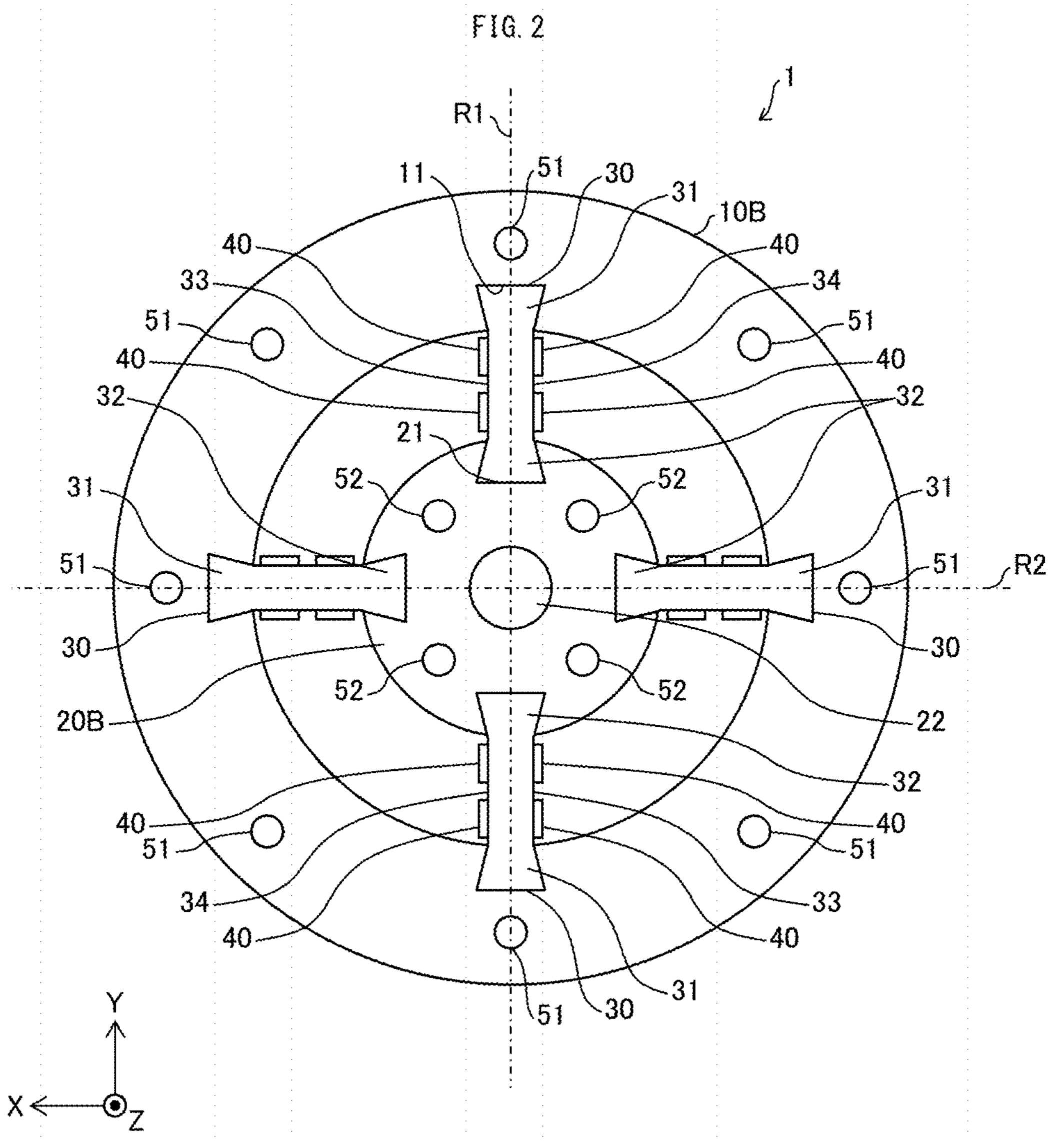
FIG. 2 is a plan view illustrating a configuration of the torque sensor in accordance with the first embodiment of the present disclosure.

FIG. 2 is a plan view illustrating a configuration of the torque sensor in accordance with the first embodiment of the present disclosure. FIG. 2 is a plan view of an A-A cross-section of the torque sensor 1 shown in FIG. 1, viewed from the first frame part 10A side. The first frame part 10A and the second frame part 10B have first recesses 11 respectively provided on radiation axes R1 and R2 radially extending from a center axis of the first frame part 10A. The first core part 20A and the second core part 20B have second recesses 21 respectively provided on the radiation axes R1 and R2 radially extending from the center axis of the first frame part 10A. The number of first recesses 11 provided to the torque sensor 1 is the same as that of the second recesses 21. The torque sensor 1 includes the torque detectors 30 whose number is equal to each of the number of first recesses 11 and the number of second recesses 21. The plurality of torque detectors 30 are disposed on the radiation axes R1 and R2 radially extending from the center axis of the first frame part 10A. Each of the torque s 30 has a linear symmetric shape about the radiation axis R1 or R2. The plurality of first recesses 11, the plurality of second recesses 21, and the plurality of torque detectors 30 are arranged, at equal intervals, on a circle around the center axis of the first frame part 10A.

The first end 31 and the second end 32 of each of the torque detectors 30 have a shape wider than a beam part between the first end 31 and the second end 32 when seen in a plan view. The first recess 11 formed between the bottom surfaces of the first frame part 10A and the second frame part 10B has a shape fittable to the first end 31. The second recess 21 formed between the bottom surfaces of the first core part 20A and the second core part 20B has a shape fittable to the second end 32.

Each of the torque detectors 30 has film-shaped strain gauges 40 disposed on side surfaces 33 and 34 of the torque detector 30, the side surfaces 33 and 34 being orthogonal to the bottom surface of the first frame part 10A. Into a hollow space 22 in the first core part 20A and the second core part 20B, an output shaft of an actuator is inserted, for example. The output shaft of the actuator extends along the Z-axis direction. The film-shaped strain gauges 40 detect strain of the torque detector 30 caused by rotation of the output shaft of the actuator.

The first frame part 10A and the second frame part 10B have holes 51 disposed on radiation axes radially extending from the center axis of the first frame part 10A, the holes 51 allowing fastening members 50 to be screwed thereinto. The first core part 20A and the second core part 20B have holes 52 disposed on radiation axes radially extending from the center axis of the first frame part 10A, the holes 52 allowing fastening members 50 to be screwed thereinto.

(Method for Manufacturing Torque Sensor)

The first frame part 10A, the second frame part 10B, the first core part 20A, and the second core part 20B are made of a material selected from various materials including metal materials such as a stainless steel, aluminum, and magnesium, resin materials, and ceramics. The first frame part 10A, the second frame part 10B, the first core part 20A, and the second core part 20B can be manufactured by, e.g., casting involving use of a casting mold and cutting.

Each of the torque detectors 30 is formed in a columnar shape by using a material selected from various materials including metal materials such as a stainless steel, aluminum, and magnesium, resin materials, and ceramics. Each of the film-shaped strain gauges 40 is made of, e.g., a thin film of chromium nitride (NCr). Each of the film-shaped strain gauges 40 is formed, by a thin film forming technique such as sputtering and vapor deposition, in the side surfaces 33 and 34 of the torque detector 30 formed in a columnar shape (first step). Since the film-shaped strain gauge 40 can be formed in a state where the torque detector 30 is separated from the first frame part 10A and the like, the film-shaped strain gauge 40 can be formed at a position determined with improved accuracy, as compared to the conventional techniques.

The following will describe assembling of the torque sensor 1. The first end 31 of the torque detector 30 is placed in the recess 11B of the second frame part 10B, so as to be fitted to the recess 11B. The second end 32 of the torque detector 30 is placed in the recess 21B of the second core part 20B, so as to be fitted to the recess 21B. In order that the recess 11A is fitted to the first end 31, the first frame part 10A is placed on the first end 31 of the torque detector 30. In order that the recess 21A is fitted to the second end 32, the first core part 20A is placed on the second end 32 of the torque detector 30. Consequently, the bottom surfaces of the first frame part 10A and the second frame part 10B face each other, so that the first end 31 of the torque detector 30 is sandwiched, in the first recess 11, between the bottom surfaces of the first frame part 10A and the second frame part 10B. The bottom surfaces of the first core part 20A and the second core part 20B face each other, so that the second end 32 of the torque detector 30 is sandwiched, in the second recess 21, between the bottom surfaces of the first core part 20A and the second core part 20B (second step). The side surfaces 33 and 34 of the torque detector 30 in which the film-shaped strain gauges 40 are formed are side surfaces which are made orthogonal to the bottom surfaces of the first frame part 10A and the second frame part 10B, respectively, in the second step.

Next, by screwing the fastening members 50 into the holes 51 of the first frame part 10A and the second frame part 10B, the first frame part 10A and the second frame part 10B are fastened to each other. Further, by screwing the fastening members 50 into the holes 52 of the first core part 20A and the second core part 20B, the first core part 20A and the second core part 20B are fastened to each other (third step).

It is possible to provide a plurality of types of torque detectors 30 which are made different in dimension, material, position of the film-shaped strain gauge 40, and/or the like according to the purpose of use of the torque sensor 1. For example, by changing the material and thickness, it is possible to provide a torque detector 30 having changed sensitivity, changed detection accuracy, changed output response characteristics, and the like with respect to deformation. A user of the torque sensor 1 can detach the fastening members 50 from the torque sensor 1 to exchange the torque detector(s) 30 with the one(s) designed according to the desired purpose.

Second Embodiment

The following will describe a second embodiment of the present disclosure. For convenience of description, a member having a function identical to that of a member discussed in the first embodiment above is given an identical reference sign, and a description thereof is omitted.

Figure 3:
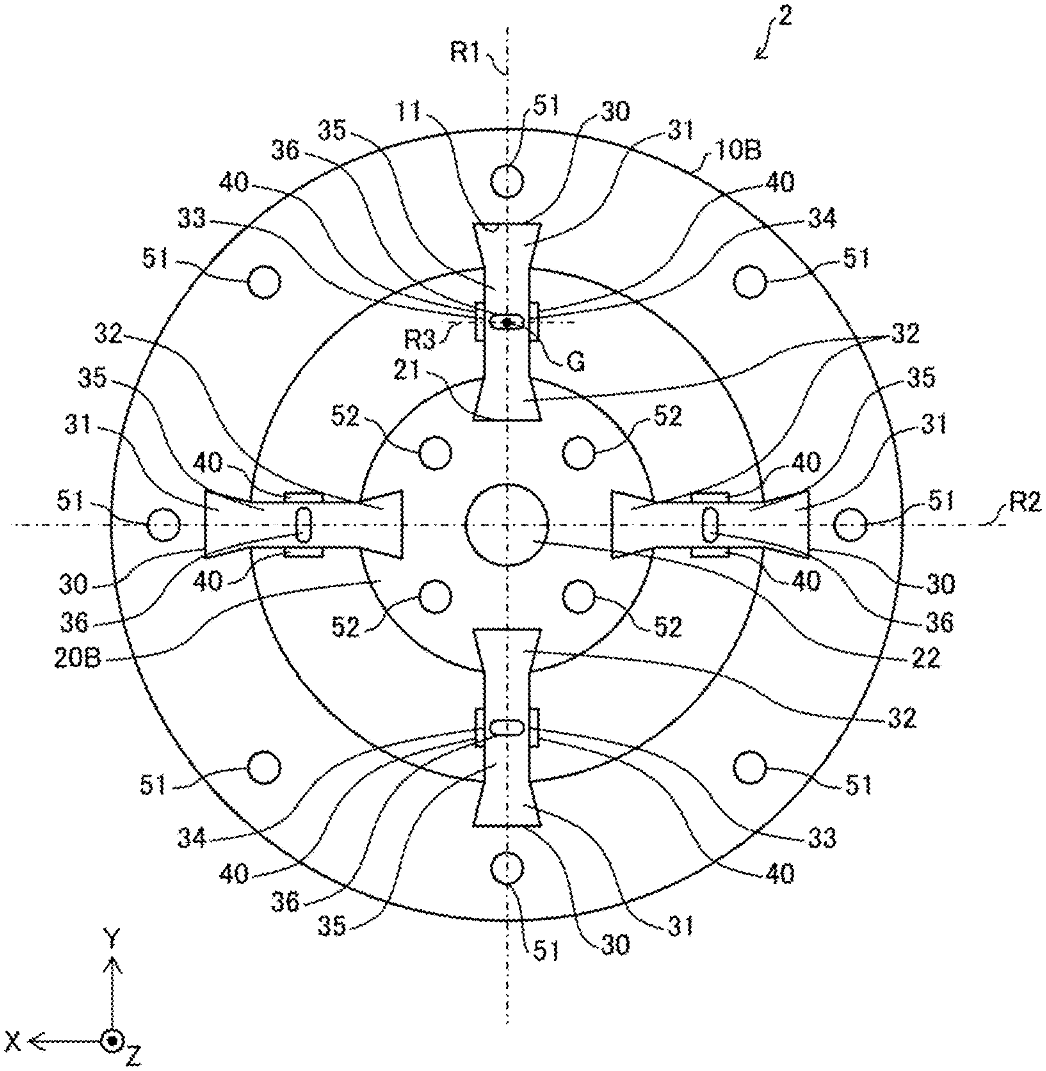
FIG. 3 is a plan view illustrating a configuration of a torque sensor in accordance with a second embodiment of the present disclosure.

FIG. 3 is a plan view illustrating a configuration of a torque sensor in accordance with the second embodiment of the present disclosure. A torque sensor 2 shown in FIG. 3 differs from the torque sensor 1 shown in FIGS. 1 and 2 in that the torque sensor 2 includes torque sensors 30 each having a side surface provided with a through-hole 36. To be more specific, each of the torque detectors 30 of the torque sensor 2 has the through-hole 36 in a center of a side surface 35 which becomes parallel with a bottom surface of a first frame part 10A when the torque detector 30 is assembled into the torque sensor 2. The through-hole 36 extends from the side surface 35 of the torque detector 30 shown in FIG. 3 to a side surface opposite to the side surface 35 so that the through-hole 36 penetrates through the torque detector 30. When seen in a plan view, a center of gravity G of the torque detector 30 is placed in an inside of an opening of the through-hole 36.

The opening of the through-hole 36 has a shape having a first length being along a direction R3 which is orthogonal to a radiation axis R1 or R2 and which is in parallel with the bottom surface of the first frame part 10A and a second length being along a direction which is in parallel with the radiation axis R1 or R2 where the torque detector 30 is disposed, the first length being longer than the second length. For example, the through-hole 36 is formed by cutting and/or the like in the process of forming the torque detector 30. The opening of the through-hole 36 is in the shape of a rectangle having rounded corners. A method for forming the through-hole 36 is not limited only to cutting. The opening of the through-hole 36 may be in the shape of a rectangle whose corners are not rounded, an oval, or the like.

In a case where the through-hole 36 is provided in the side surface 35 of the torque detector 30 in this manner, center portions of the side surfaces 33 and 34 of the torque detector 30 will have strain caused by rotation of an output shaft of an actuator or the like inserted into a hollow space 22, the strain being larger than that caused in a configuration not having the through-hole 36. Each of the center portions of the side surfaces 33 and 34 refers to, for example, a range of a given distance from a center of the side surface 33 or 34. Here, the given distance refers to, for example, a length in the direction R3 of the through-hole 36. Either in a case where the shape of the through-hole 36 is changed into a perfect circle and in a case where the longer direction and the shorter direction of the through-hole 36 are replaced with each other, the effect of increased strain in the center portions of the side surfaces 33 and 34 was not confirmed.

In the torque sensor 2, film-shaped strain gauges 40 are disposed in the center portions of the side surfaces 33 and 34 of the torque detector 30. That is, the film-shaped strain gauges 40 are disposed at portions of the side surfaces 33 and 34 of the torque detector 30 into which portions large strain is output due to provision of the through-hole 36 in the side surface 35 of the torque detector 30. With this, the torque sensor 2 can achieve improved measurement sensitivity than that of the torque sensor 1.

Further, the torque sensor 2 is configured such that, when seen in a plan view, the through-hole 36 is disposed so that a center of gravity G of the torque detector 30 is placed in an inside of an opening of the through-hole 36. With this, the number of through-holes 36 provided to the torque detector 30 is minimized. There is a trade-off relation between an allowable load and measurement sensitivity of the torque sensor. By minimizing the number of through-holes 36 provided to the torque detector 30, it is possible to improve the measurement sensitivity without excessively reducing the allowable load of the torque sensor 2.

[Variations]

In accordance with the above embodiments, the first core part 20A and the second core part 20B each have a tubular shape. However, each of the shapes of the first core part 20A and the second core part 20B is not limited to the tubular shape. Each of the shapes of the first core part 20A and the second core part 20B may be any shape, provided that it is a shape having, in its center, a hole into which the output shaft can be inserted. Further, the hole into which the output shaft is inserted may not be a through-hole. For example, in a case where the torque sensor 1 is attached to a tip end of the output shaft, each of the first core part 20A and the second core part 20B may have a columnar shape not having a through-hole.

In the above embodiments, the first end 31 of the torque detector 30 is sandwiched, in the first recess 11, between the bottom surfaces of the first frame part 10A and the second frame part 10B. However, the first end 31 of the torque detector 30 may be sandwiched by any manner, provided that it allows the first end 31 of the torque detector 30 to be fixed in a state where the first end 31 is sandwiched between the bottom surfaces of the first frame part 10A and the second frame part 10B. For example, the depth of the recess 11A forming the first recess 11 may be made equal to the length in the Z-axis direction of the torque detector 30 so that the depth of the recess 11B becomes zero. Further, the second end 32 of the torque detector 30 may be sandwiched by any manner, provided that it allows the second end 32 of the torque detector 30 to be fixed in a state where the second end 32 is sandwiched between the bottom surfaces of the first core part 20A and the second core part 20B.

In the above embodiments, each of the torque sensors 1 and 2 is configured such that the four torque detectors 30 are arranged, at intervals of 90 degrees, on the circle around the center axis of the first frame part 10A. However, the number of torque detectors 30 provided to each of the torque sensors 1 and 2 is not limited to four. Each of the torque sensors 1 and 2 may be configured such that, for example, eight torque detectors 30 are arranged, at intervals of 45 degrees, on the circle around the center axis of the first frame part 10A.

In the above embodiments, each of the torque detectors 30 is configured such that the film-shaped strain gauges 40 are disposed on the side surfaces 33 and 34 which become orthogonal to the bottom surface of the first frame part 10A when the torque detector 30 is assembled into the torque sensor 1. However, the positions where the film-shaped strain gauges 40 are disposed are not limited to the side surfaces 33 and 34 of the torque detector 30. For example, each of the torque detectors 30 may be configured such that a film-shaped strain gauge 40 is further disposed on a side surface which becomes parallel with the bottom surface of the first frame part 10A when the torque detector 30 is assembled into the torque sensor 1.

[Items]

(Item 1) A torque sensor including: a first frame part having a tubular shape; a second frame part disposed at a location where a bottom surface of the second frame part faces a bottom surface of the first frame part, the second frame part having a tubular shape concentric to the first frame part; a first core part disposed in a hollow space of the first frame part, the first core part having a tubular or columnar shape concentric to the first frame part; a second core part disposed at a location which is in a hollow space of the second frame part and where a bottom surface of the second core part faces a bottom surface of the first core part, the second core part having a tubular or columnar shape concentric to the first frame part; and at least one torque detector having a columnar shape, the at least one torque detector having one end sandwiched between the bottom surfaces of the first frame part and the second frame part, the at least one torque detector having the other end sandwiched between the bottom surfaces of the first core part and the second core part, the at least one torque detector having film-shaped strain gauges respectively provided to two side surfaces of the at least one torque detector, the two side surfaces being orthogonal to the bottom surface of the first frame part.

With the above configuration, since the film-shaped strain gauge 40 can be formed in the torque detector 30 in a state where the torque detector 30 is separated from the first frame part 10A and the like, it is possible to accurately position the film-shaped strain gauge 40. Thus, it is possible to provide the torque sensor 1 capable of measuring a torque with high accuracy.

(Item 2) The torque sensor described in the item 1, wherein: the at least one torque detector being disposed on a corresponding one of radiation axes extending radially from a center axis of the first frame part, the at least one torque detector having a linear symmetric shape about the corresponding one of the radiation axes.

According to the above configuration, for a torque caused by rotation around the center axis (Z axis) of the first frame part 10A, the torque detector 30 can accurately measure a positive-direction torque and a negative-direction torque under the same condition.

(Item 3) The torque sensor described in the item 1 or 2, wherein: the at least one torque detector includes a plurality of torque detectors; and the plurality of torque detectors are arranged, at equal intervals, on a circle around the center axis of the first frame part.

According to the above configuration, the film-shaped strain gauges 40 are equally influenced by external force around the Z-axis. Thus, from the viewpoint of accurate detection of a torque, the above configuration is advantageous.

(Item 4) The torque sensor described in any one of the items 1 to 3, wherein: each of the bottom surfaces of the first frame part and the second frame part has a first recess which is recessed in a shape fittable to the one end of the at least one torque detector; and each of the bottom surfaces of the first core part and the second core part has a second recess which is recessed in a shape fittable to the other end of the at least one torque detector.

According to the above configuration, it is possible to fix the first end 31 and the second end 32 of the torque detector 30 in a stable manner.

(Item 5) The torque sensor described in any one of the items 1 to 4, wherein: the one end and the other end of the at least one torque detector each have a shape wider than a beam part between the one end and the other end of the at least one torque detector when seen in a plan view.

According to the above configuration, when viewed from the bottom surface of the first frame part 10A, the first end 31 and the second end 32 of the torque detector 30 each have a shape wider than the beam part between the first end 31 and the second end 32 of the torque detector 30. By fitting the first end 31 to the first recess 11 and fitting the second end 32 to the second recess 21 in such a configuration, it is possible to reduce rattling which may otherwise be caused with respect to a direction of a torque to be detected, as compared to a case where a torque detector having a protrusion vertical to the bottom surface of the first frame part 10A is fitted.

(Item 6) The torque sensor described in any one of the items 1 to 5, further including: film-shaped strain gauges provided to, among side surfaces of the at least one torque detector, two side surfaces which are in parallel with the bottom surface of the first frame part.

According to the above configuration, it is possible to employ the torque sensor 1 as a six-axis torque sensor.

(Item 7) A torque detector for use in a torque sensor that includes: a first frame part having a tubular shape; a second frame part disposed at a location where a bottom surface of the second frame part faces a bottom surface of the first frame part, the second frame part having a tubular shape concentric to the first frame part; a first core part disposed in a hollow space of the first frame part, the first core part having a tubular or columnar shape concentric to the first frame part; and a second core part disposed at a location which is in a hollow space of the second frame part and where a bottom surface of the second core part faces a bottom surface of the first core part, the second core part having a tubular or columnar shape concentric to the first frame part, the torque detector having a columnar shape, the torque detector including: one end sandwiched between the bottom surfaces of the first frame part and the second frame part; the other end sandwiched between the bottom surfaces of the first core part and the second core part; and film-shaped strain gauges respectively provided to two side surfaces of the torque detector, the two side surfaces being orthogonal to the bottom surface of the first frame part.

According to the above configuration, since the film-shaped strain gauge 40 can be formed in the torque detector 30 in a state where the torque detector 30 is separated from the first frame part 10A and the like, it is possible to accurately position the film-shaped strain gauge 40. Thus, it is possible to provide the torque sensor 1 capable of measuring a torque with high accuracy.

(Item 8) A method for manufacturing a torque sensor that includes: a first frame part having a tubular shape; a second frame part disposed at a location where a bottom surface of the second frame part faces a bottom surface of the first frame part, the second frame part having a tubular shape concentric to the first frame part; a first core part disposed in a hollow space of the first frame part, the first core part having a tubular or columnar shape concentric to the first frame part; a second core part disposed at a location which is in a hollow space of the second frame part and where a bottom surface of the second core part faces a bottom surface of the first core part, the second core part having a tubular or columnar shape concentric to the first frame part; and a torque detector, the method including: a first step of forming a film-shaped strain gauge on a side surface of the torque detector formed in a columnar shape; a second step of causing one end of the torque detector to be sandwiched between the bottom surfaces of the first frame part and the second frame part and causing the other end of the torque detector to be sandwiched between the bottom surfaces of the first core part and the second core part; and a third step of fastening the first frame part and the second frame part to each other and fastening the first core part and the second core part to each other, the side surface of the torque detector on which side surface the film-shaped strain gauge is formed in the first step being the side surface which is made orthogonal to the bottom surfaces of the first frame part and the second frame part in the second step.

According to the above configuration, since the film-shaped strain gauge 40 can be formed in the torque detector 30 in a state where the torque detector 30 is separated from the first frame part 10A and the like in the first step, it is possible to accurately position the film-shaped strain gauge 40. Thus, it is possible to provide the torque sensor 1 capable of measuring a torque with high accuracy.

(Item 9) The torque sensor described in the item 2, wherein: the at least one torque detector having a through-hole extending between two side surfaces of the at least one torque detector so that the through-hole penetrates through the at least one torque detector, the two side surfaces being in parallel with the bottom surface of the first frame part; an opening of the through-hole has a shape having a first length being along a direction which is orthogonal to the corresponding one of the radiation axes in which the at least one torque detector is disposed and which is in parallel with the bottom surface of the first frame part and a second length being along a direction which is in parallel with the corresponding one of the radiation axes, the first length being longer than the second length.

According to the above configuration, regions of the side surfaces 33 and 34 of the torque detector 30 which regions correspond to a position of the side surface 35 where the through-hole 36 is provided will have strain caused by rotation of the output shaft, the strain being larger than that caused in a configuration not having the through-hole 36. Thus, it is possible to improve the measurement sensitivity of the torque sensor.

(Item 10) The torque sensor described in the item 9, wherein: a center of gravity of the at least one torque detector is placed in an inside of the opening of the through-hole when seen in a plan view.

According to the above configuration, when seen in a plan view, the through-hole 36 is disposed so that the center of gravity G of the torque detector 30 is placed in the inside of the opening of the through-hole 36. With this, the number of through-holes 36 provided to the torque sensor 2 is minimized. This makes it possible to improve the measurement sensitivity without excessively reducing the allowable load of the torque sensor.

(Item 11) The torque detector described in the item 7, further including: a through-hole extending between two side surfaces of the torque detector so that the through-hole penetrates through the torque detector, the two side surfaces being in parallel with the bottom surface of the first frame part, wherein: the torque detector is disposed on a corresponding one of radiation axes extending radially from a center axis of the first frame part, the torque detector having a linear symmetric shape about the corresponding one of the radiation axes; and an opening of the through-hole has a shape having a first length being along a direction which is orthogonal to the corresponding one of the radiation axes and which is in parallel with the bottom surface of the first frame part and a second length being along a direction which is in parallel with the corresponding one of the radiation axes, the first length being longer than the second length.

By employing the torque detector configured as above in the torque sensor, regions of the side surfaces 33 and 34 of the torque detector 30 which regions correspond to a position of the side surface 35 where the through-hole 36 is provided will have strain caused by rotation of the output shaft, the strain being larger than caused in a configuration not having the through-hole 36. Thus, it is possible to improve the measurement sensitivity of the torque sensor.

ADDITIONAL REMARK

The present disclosure is not limited to the above embodiments, but can be altered in various ways within the scope of the claims. The present disclosure also encompasses, in its technical scope, any embodiment derived by appropriately combining technical means disclosed in differing embodiments.

The invention claimed is:

1. A torque sensor comprising:

a first frame part having a tubular shape;

a second frame part disposed at a location where a bottom surface of the second frame part faces a bottom surface of the first frame part, the second frame part having a tubular shape concentric to the first frame part;

a first core part disposed in a hollow space of the first frame part, the first core part having a tubular or columnar shape concentric to the first frame part;

a second core part disposed at a location which is in a hollow space of the second frame part and where a bottom surface of the second core part faces a bottom surface of the first core part, the second core part having a tubular or columnar shape concentric to the first frame part; and at least one torque detector having a columnar shape, the at least one torque detector having one end sandwiched between the bottom surfaces of the first frame part and the second frame part, the at least one torque detector having another end sandwiched between the bottom surfaces of the first core part and the second core part, the at least one torque detector having film-shaped strain gauges respectively provided to two side surfaces of the at least one torque detector, the two side surfaces being orthogonal to the bottom surface of the first frame part.

2. The torque sensor according to claim 1, wherein:

the at least one torque detector being disposed on a corresponding one of radiation axes extending radially from a center axis of the first frame part, the at least one torque detector having a linear symmetric shape about the corresponding one of the radiation axes.

3. The torque sensor according to claim 1, wherein:

the at least one torque detector comprises a plurality of torque detectors; and the plurality of torque detectors are arranged, at equal intervals, on a circle around a center axis of the first frame part.

4. The torque sensor according to claim 1, wherein:

each of the bottom surfaces of the first frame part and the second frame part has a first recess which is recessed in a shape fittable to the one end of the at least one torque detector; and each of the bottom surfaces of the first core part and the second core part has a second recess which is recessed in a shape fittable to the other end of the at least one torque detector.

5. The torque sensor according to claim 1, wherein:

the one end and the other end of the at least one torque detector each have a shape wider than a beam part between the one end and the other end of the at least one torque detector when seen in a plan view.

6. The torque sensor according to claim 1, further comprising:

film-shaped strain gauges provided to, among side surfaces of the at least one torque detector, two side surfaces which are in parallel with the bottom surface of the first frame part.

7. A torque detector for use in a torque sensor that includes: a first frame part having a tubular shape; a second frame part disposed at a location where a bottom surface of the second frame part faces a bottom surface of the first frame part, the second frame part having a tubular shape concentric to the first frame part; a first core part disposed in a hollow space of the first frame part, the first core part having a tubular or columnar shape concentric to the first frame part; and a second core part disposed at a location which is in a hollow space of the second frame part and where a bottom surface of the second core part faces a bottom surface of the first core part, the second core part having a tubular or columnar shape concentric to the first frame part, the torque detector having a columnar shape, the torque detector comprising:

one end sandwiched between the bottom surfaces of the first frame part and the second frame part;

another end sandwiched between the bottom surfaces of the first core part and the second core part; and film-shaped strain gauges respectively provided to two side surfaces of the torque detector, the two side surfaces being orthogonal to the bottom surface of the first frame part.

8. A method for manufacturing a torque sensor that includes: a first frame part having a tubular shape; a second frame part disposed at a location where a bottom surface of the second frame part faces a bottom surface of the first frame part, the second frame part having a tubular shape concentric to the first frame part; a first core part disposed in a hollow space of the first frame part, the first core part having a tubular or columnar shape concentric to the first frame part; a second core part disposed at a location which is in a hollow space of the second frame part and where a bottom surface of the second core part faces a bottom surface of the first core part, the second core part having a tubular or columnar shape concentric to the first frame part; and a torque detector, the method comprising:

a first step of forming a film-shaped strain gauge on a side surface of the torque detector formed in a columnar shape;

a second step of causing one end of the torque detector to be sandwiched between the bottom surfaces of the first frame part and the second frame part and causing another end of the torque detector to be sandwiched between the bottom surfaces of the first core part and the second core part; and a third step of fastening the first frame part and the second frame part to each other and fastening the first core part and the second core part to each other, the side surface of the torque detector on which side surface the film-shaped strain gauge is formed in the first step being the side surface which is made orthogonal to the bottom surfaces of the first frame part and the second frame part in the second step.

9. The torque sensor according to claim 2, wherein:

the at least one torque detector having a through-hole extending between two side surfaces of the at least one torque detector so that the through-hole penetrates through the at least one torque detector, the two side surfaces being in parallel with the bottom surface of the first frame part;

an opening of the through-hole has a shape having a length being along a direction which is orthogonal to the corresponding one of the radiation axes in which the at least one torque detector is disposed and which is in parallel with the bottom surface of the first frame part and a second length being along a direction which is in parallel with the corresponding one of the radiation axes, the first length being longer than the second length.

10. The torque sensor according to claim 9, wherein:

a center of gravity of the at least one torque detector is placed in an inside of the opening of the through-hole when seen in a plan view.

11. The torque detector according to claim 7, further comprising:

a through-hole extending between two side surfaces of the torque detector so that the through-hole penetrates through the torque detector, the two side surfaces being in parallel with the bottom surface of the first frame part, wherein:

the torque detector is disposed on a corresponding one of radiation axes extending radially from a center axis of the first frame part, the torque detector having a linear symmetric shape about the corresponding one of the radiation axes; and an opening of the through-hole has a shape having a first length being along a direction which is orthogonal to the corresponding one of the radiation axes and which is in parallel with the bottom surface of the first frame part and a second length being along a direction which is in parallel with the corresponding one of the radiation axes, the first length being longer than the second length.

* * * * *